(12) United States Patent
Enomoto et al.

(10) Patent No.: US 6,698,795 B2
(45) Date of Patent: Mar. 2, 2004

(54) SEAT BELT SYSTEM FOR VEHICLES

(75) Inventors: Hiroaki Enomoto, Hiroshima (JP);
Kouji Kishino, Hiroshima (JP);
Takashi Mizuma, Hiroshima (JP)

(73) Assignee: Mazda Motors Corporation (JP)

( * ) Notice: Subject to any disclaimer, the term of this patent is extended or adjusted under 35 U.S.C. 154(b) by 64 days.

(21) Appl. No.: 10/107,542

(22) Filed: Mar. 28, 2002

(65) Prior Publication Data

US 2002/0167158 A1 Nov. 14, 2002

(30) Foreign Application Priority Data

Mar. 29, 2001 (JP) ........................................ 2001-095620

(51) Int. Cl.⁷ ............................................. B60R 22/24
(52) U.S. Cl. ................................... 280/808; 296/146.11
(58) Field of Search ................................. 280/808, 803, 280/804; 297/481, 483; 296/146.11

(56) References Cited

U.S. PATENT DOCUMENTS

| | | | | |
|---|---|---|---|---|
| 2,997,336 A | * | 8/1961 | Huggins et al. | ........ 296/146.11 |
| 3,819,196 A | | 6/1974 | Bouthors et al. | |
| 4,007,802 A | | 2/1977 | DE Rosa | |
| 4,451,060 A | * | 5/1984 | Sylven | ........................ 280/804 |
| 4,475,746 A | * | 10/1984 | Akiyama | .................... 280/808 |
| 4,817,754 A | * | 4/1989 | Muramoto | .................. 280/808 |
| 4,909,539 A | | 3/1990 | Morner | |
| 4,915,414 A | * | 4/1990 | Weman | .................... 280/801.1 |
| 5,044,459 A | | 9/1991 | Nishikaji | |

FOREIGN PATENT DOCUMENTS

| | | |
|---|---|---|
| DE | 3539051 | 5/1986 |
| EP | 0041859 | 12/1981 |
| FR | 2474413 | 7/1981 |
| FR | 2646641 A | 11/1990 |
| JP | 55004248 | 1/1980 |
| JP | 63-130450 A | 6/1988 |
| JP | 63222957 | 9/1988 |
| JP | 8-142680 A | 6/1996 |
| JP | 2001138864 | 5/2001 |

* cited by examiner

*Primary Examiner*—Peter C. English
(74) *Attorney, Agent, or Firm*—Nixon Peabody LLP; Donald R. Studebaker

(57) ABSTRACT

A seat belt system for a vehicle, for restraining an occupant in a seat disposed in a compartment of the vehicle. The vehicle comprises an opening formed on at least one side of the vehicular body, and a first door moving between a first state where the first door closes at least a part of the opening and a second state where the first door opens the opening. The seat belt system includes a belt webbing, a retractor disposed in the first door for retracting the proximal end of the belt webbing, and a sliding device fixed on a lower edge of the opening, to which the distal end of the belt webbing is attached. The sliding device permits the distal end of the belt webbing to slide along the lower edge of the opening between a forward position and a rearward position. The distal end of the belt webbing is located at the rearward position when the first door is in the second state.

11 Claims, 9 Drawing Sheets

US 6,698,795 B2

SEAT BELT SYSTEM FOR VEHICLES

TECHNICAL FIELD OF THE INVENTION

The present invention relates to a seat belt system for a vehicle, more particularly, a seat belt system for a vehicle equipped with a double door structure.

BACKGROUND OF THE INVENTION

Conventionally, a double door structure is well known as disclosed in Japanese patent publication No. H8-142680. The conventional structure includes a lock pillar extending vertically in the middle portion of a rear opening which is opened and closed by a left-side door and a right-side door in a double door configuration.

Such a double door structure may be provided for an ingress and egress opening on the side of a vehicle. In such a double door structure as described above, a center-pillar extends vertically in the middle portion of the ingress and egress opening, which is beneficial to the rigidity of the vehicle body, but is disadvantageous to the openness of the opening. To enhance the openness, a center-pillar-less structure, i.e. a structure without the center-pillar, is preferable.

As noted a double door structure combined with the center-pillar-less body as described above is preferred; however, in the case where a seat belt system is so configured that its belt webbing extends from the rear door to the passenger compartment, an extended length of the belt webbing spans between the frontal portion of the rear door and the lower portion of the door opening of the body. This impedes ingress and egress for rear passengers.

Meanwhile, Japanese patent publication No. S63-130450 discloses a seat belt system, which is so configured that a belt webbing of the seat belt system for the front-seat passenger extends from the inside of the rear door to a front seat. The front door and the rear door combined with the seat belt system disclosed in the patent publication referred to above are not of a double door structure, in that the rear door is swingable about its frontal portion and the belt webbing is located in the vicinity of the pivotal axis of the rear door, causing no difficulties for the rear door to open. However, if such a seat belt system were to be used in the double door structure referred to hereinabove, the same problem as described above still disadvantageously remains.

SUMMARY OF THE INVENTION

In view of the problems referred to above, an object of the present invention is to provide a seat belt system for a vehicle which achieves enhanced convenience of ingress and egress for the passengers with the improved appearance of the belt webbing of the seat belt system while the door is open, especially, which attains the openness of the door opening and improved accessibility for the legs of the passenger.

To achieve the above noted object, according to an aspect of the present invention, a seat belt system for a vehicle, for restraining the passenger in a seat disposed in a passenger compartment of the vehicle is provided. The vehicle includes an opening formed on at least one side of a vehicular body, and a first door moving between a first state where the first door closes at least a part of the opening and a second state where the first door opens the opening, the seat belt system comprising, a belt webbing, a retractor disposed in the first door, for retracting a proximal end of the belt webbing and a slider to which a distal end of the belt webbing is attached so that the distal end of the belt webbing is allowed to slide along a lower edge of the opening between a forward position and a rearward position. Preferably, the distal end of the belt webbing may be located at the rearward position when the first door is in the second state, and located at the forward position when the first door is in the first state.

Accordingly, the distal end portion of the belt webbing slides rearwardly along the lower edge of the opening with the opening of the door, which enhances the convenience of ingress and egress for the passengers with the improved appearance of the belt webbing when the first door is open. Particularly, the present invention attains the openness of the opening and improved accessibility for the legs of the passenger entering or exiting the vehicle.

Preferably, the vehicle may include the first door swingably supported on the vehicle body at its trailing edge via a hinge and a second door swingably supported on the vehicle body at its leading edge via a hinge which cooperatively close the opening, thereby providing a continuously formed single opening.

Accordingly, the first door and the second door constitute a double door configuration without a center-pillar, which results in a larger door opening for efficient use and enhanced openness of the opening.

Preferably, the sliding mechanism may comprise a guide member disposed along the lower edge of the opening, and a slider secured to the distal end of the belt webbing and fitted onto the guide member so as to be slidable between a forward portion and a rearward portion of the guide member. More preferably, the vehicular body may include a kick-up portion stepped upwardly on which the rear seat is disposed, and the rearward portion of the guide member may be disposed laterally adjacent to the rear seat on the kick-up portion.

Accordingly, the distal end of the belt webbing slides along the lower edge of the opening according to the movement of the first door with the aid of the guide member, which ensures the sliding of the distal end of the belt webbing. Additionally, the distal end of the belt webbing slides up to the vicinity of the rear seat, or slides to a further rearward position when the first door is opened, which achieves improved convenience of ingress and egress for rear passengers.

BRIEF DESCRIPTION OF THE DRAWINGS

These and other objects, features, aspects, and advantages of the present invention will become more apparent from the following detailed description of the preferred embodiment relative to the accompanied drawings, in which.

DETAILED DESCRIPTION OF THE INVENTION

A preferred embodiment of the present invention will be described with reference to FIG. 1 to FIG. 5. Firstly, with reference to FIG. 1 to FIG. 4, a body structure and a door structure will be described.

Figure 1:
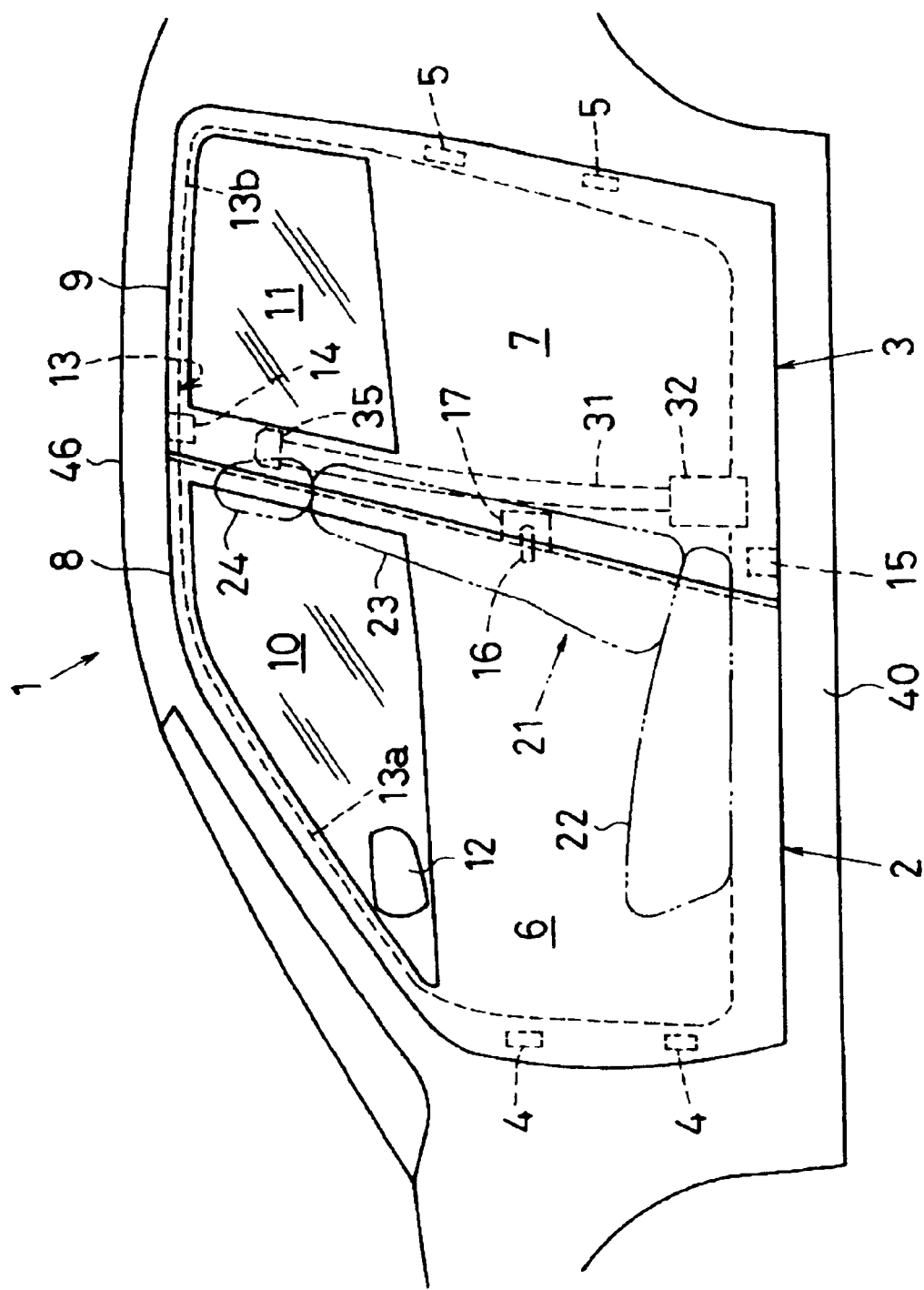
FIG. 1 is a side view of a vehicle equipped with a seat belt system according to the present invention.
Figure 3:
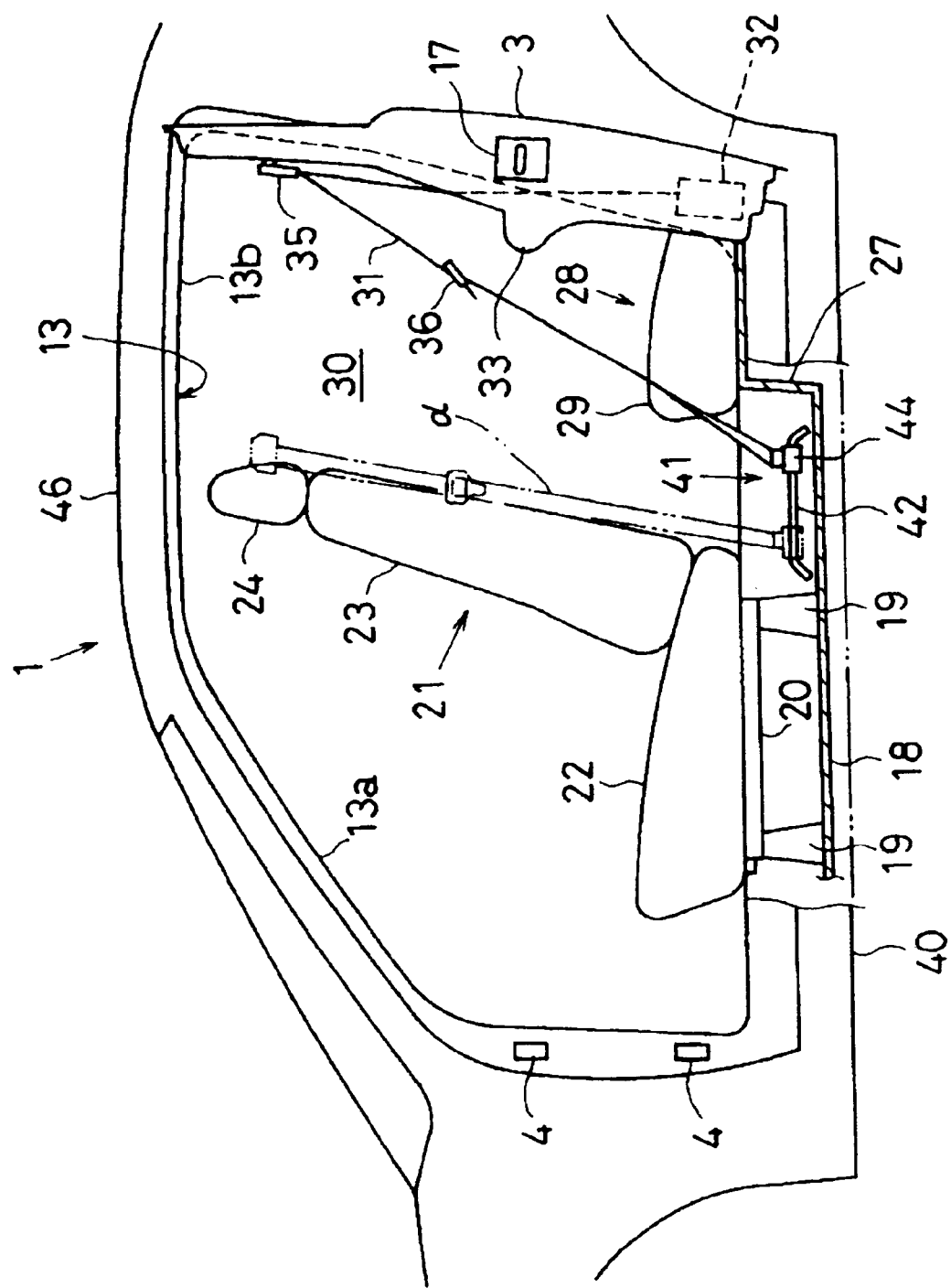
FIG. 3 is an elevational view illustrating the movement of the belt webbing by the opening of the rear door.

As shown in FIG. 1 and FIG. 3, side doors are disposed on the side portion of a body of a vehicle 1. The side doors consist of a front door 2 and a rear door 3 which are supported on the side portion of a body of the vehicle 1 via front-door hinges 4 and rear-door hinges 5 attached on the a leading edge of the front door 2 and a trailing edge of the rear door 3, respectively, constituting a side door structure in a double door configuration.

The front door 2 and the rear door 3 comprise door panels 6, 7, door sashes 8, 9, and door windows 10, 11, respectively. Within the door panel 6 and door panel 7 (specifically, in the interspace defined by a door inner-panel and a door-outer panel), side impact bars (not shown) extend in the vehicular longitudinal direction, respectively.

On the front door 2, a side mirror 12 for rearward visibility and an outside door-handle (not shown) for unlatch operation of the front door 2 from the outside are disposed.

In the double door configuration according to this embodiment, the rear door 3 is prohibited from opening unless the front door 2 is initially opened.

Inboardly adjacent to the doors in the closed position illustrated in FIG. 1, a front ingress and egress opening 13a for a front passenger and a rear ingress and egress opening 13b for a rear passenger as door openings (side openings of the vehicle) are continuously formed to provide a continuous opening 13, whereby a center-pillar-less body structure is obtained. The openings 13a and 13b are covered and uncovered, or closed and opened by the doors 2, 3 respectively.

As shown in FIG. 1, at the forward portions of the upper and lower edge of the rear door 3, locks 14, 15 are provided for locking the rear door 3 with the body, and at the middle portion of the leading edge of the rear door 3, a lock 17 is provided for locking a striker 16 on the front door 2.

Figure 2:
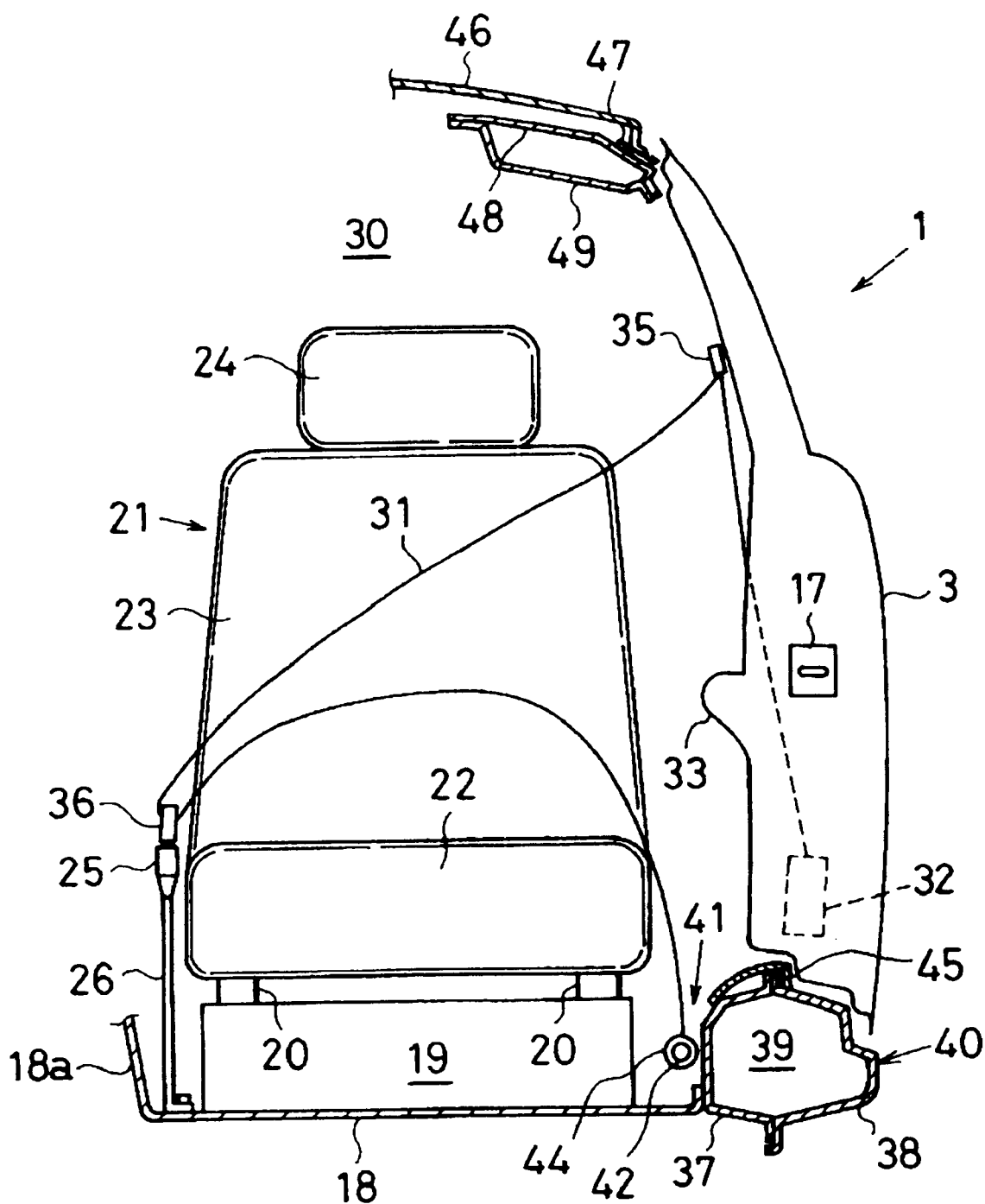
FIG. 2 is an elevational view of a front seat portion of the vehicle with the rear door in a closed state.

Additionally, as shown in FIG. 2 and FIG. 3, a front seat 21 is mounted on a floor panel 18 via brackets 19, 19 and a seat-sliding system 20. The front seat 21 comprises a seat cushion 22, a seat back 23, and a head rest 24. Between the seat cushion 22 of the front seat 21 and a center tunnel 18a, a buckle 25 is fixedly secured to the floor panel 18 via a bracket 26. Alternatively, the buckle 25 may be secured to the seat cushion via a stalk.

The rear portion of the floor panel 18 is stepped upwardly to integrally form a kick-up 27. On the top of the kick-up 27, a seat cushion 29 of a rear seat 28 is mounted. Thus, as shown in FIG. 3, in the passenger compartment 30 of the vehicle 1, two rows of seats 21, 28 are arranged in the vehicular longitudinal direction.

Figure 4:
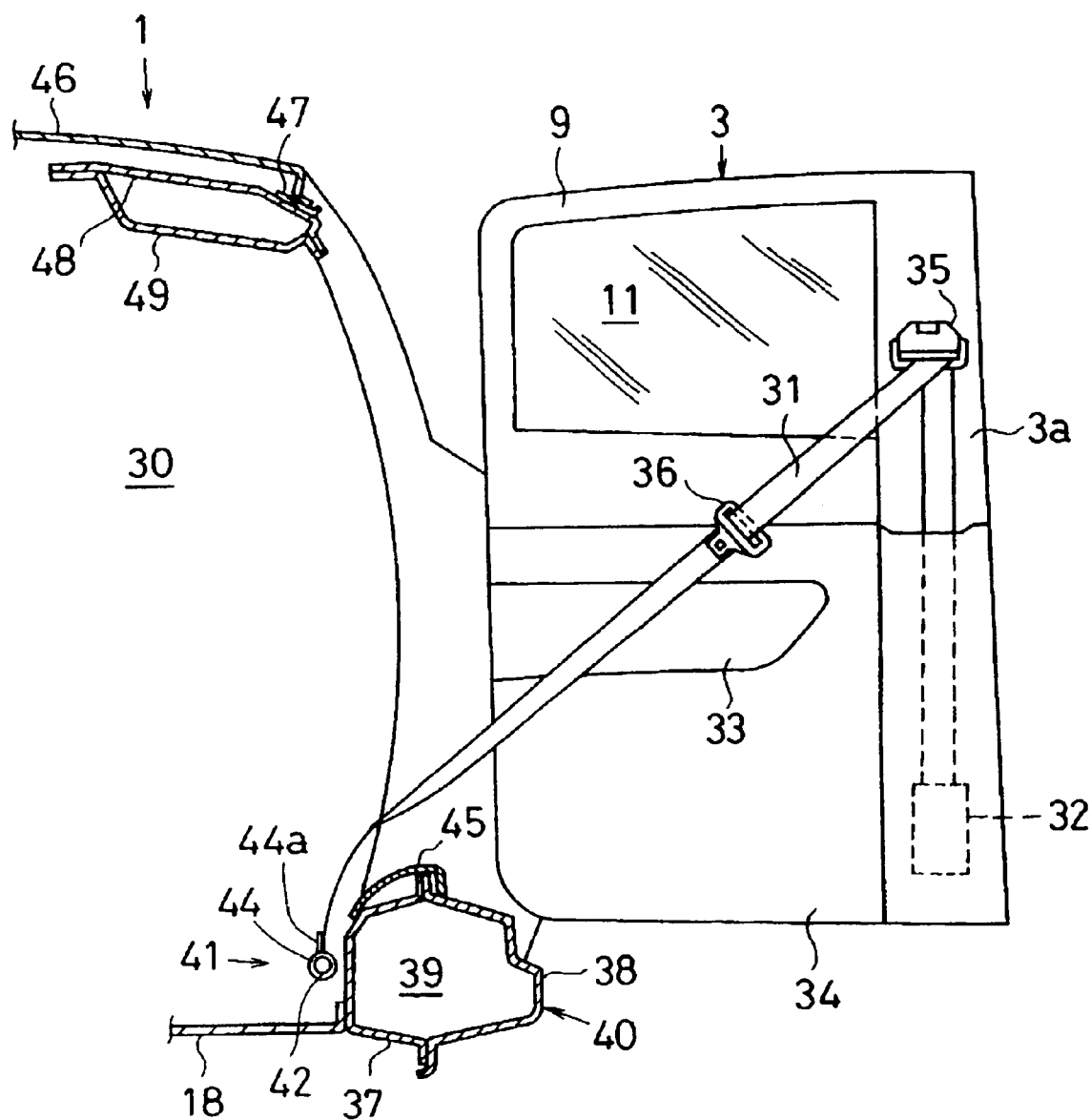
FIG. 4 is an elevational view of the portion of the vehicle illustrated in FIG. 2 with the rear door in an open state.

FIG. 2 is a partial elevational view showing the front seat 21 and the rear door 3 in the closed state, and FIG. 4 is a partial elevational view showing the rear door 3 in the open state and also depicting a belt-webbing 31 for restraining the passenger in the front seat 21.

The belt webbing 31 is retracted by a retractor 32 disposed on a front structural door-member 3a of the rear door 3. The front structural door-member 3a has the equivalent rigidity to that of a center-pillar which would be otherwise provided.

The lower half of the inboard side of the rear door 3 is covered with a door trim 34 having an arm rest 33. Additionally, at the upper portion of the inboard side of the front structural door-member 3a, a shoulder anchor 35 is attached so as to face the flank of head rest 24 of the front seat 21.

The belt webbing 31 is so arranged as to extend from the retractor 32 through the upper edge of the door trim 34 along the inboard side of the front structural door-member 3a, and reaches the passenger compartment 30 through the shoulder anchor 35. In other words, the shoulder anchor 35 supports a portion of the extended length of the belt webbing 31.

On an extended length of the belt webbing 31, a tongue 36 is slidably provided. The distal end, or the lower end of the belt webbing 31 is connected to the lower edge of the door opening 13 so as to be slidable in the vehicular longitudinal direction, as shown in FIG. 3. The sliding structure disposed on the lower end of the belt webbing 31 will be described in detail hereinbelow.

Figure 5:
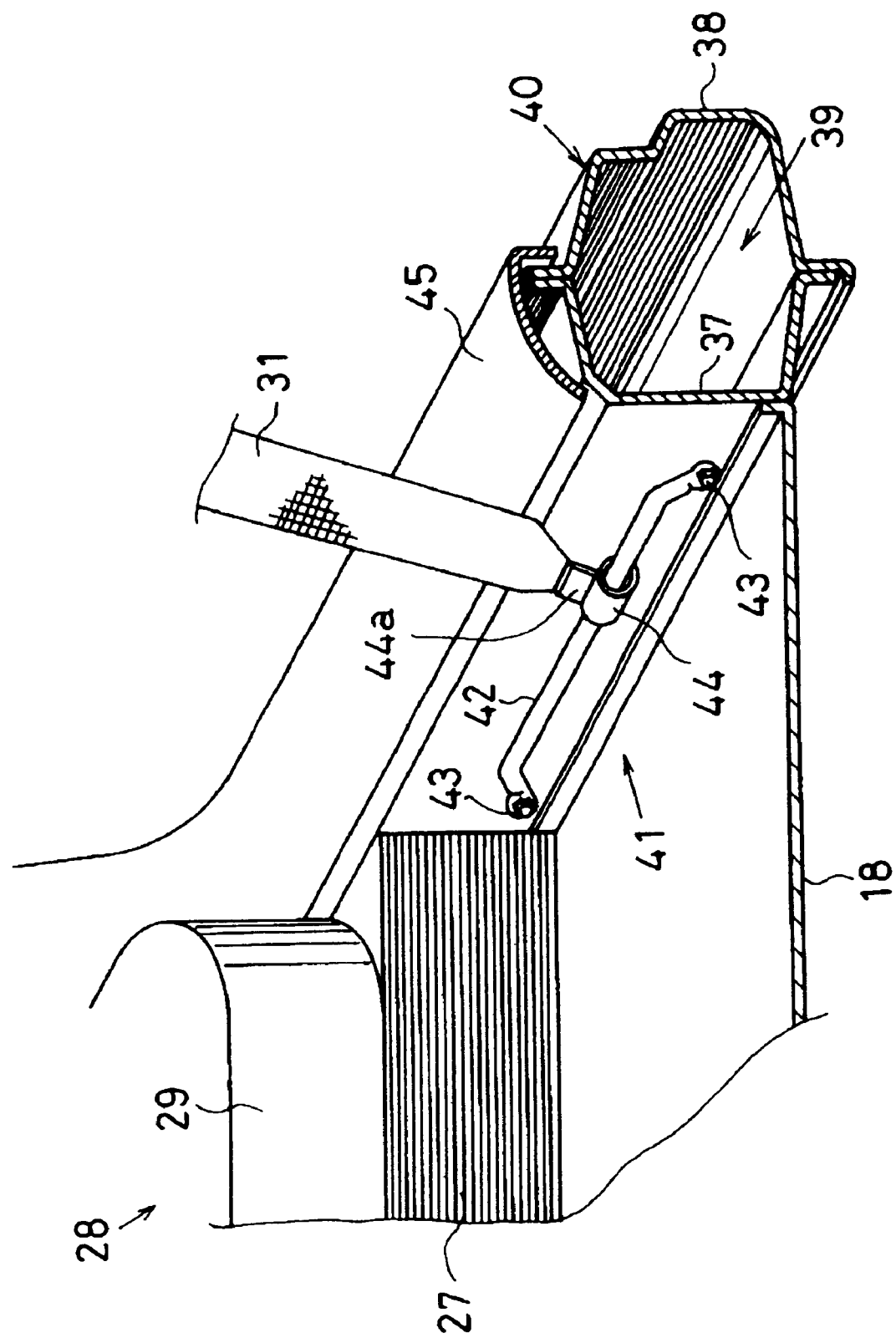
FIG. 5 is a perspective view showing the construction of the sliding device in accordance with the present invention.

As shown in FIG. 5, along both lateral sides of the floor panel (only one of which is show in the drawings), a side sill 40, which is a structural member and includes a closed cross-section 39 defined by a side-sill inner member 37 and outer member 38, is disposed. A guide member 42, an element of a sliding device 41, is fixedly secured to the side-sill inner member 37 of the side sill 40 via fasteners, for example, via bolts 43.

The sliding device 41 is arranged between the belt webbing 31 and the side-sill inner member 37 at a lower edge of the door opening 13, and comprises the guide member 42 and a slider 44 slidable forwardly and rearwardly, or between a forward position and a rearward position on the guide member 42. The slider 44 is integrally formed with a belt-attaching portion 44a at which the lower end of the belt webbing 31 is fixedly attached. Thus, the lower end of the belt webbing 31 is guided by the sliding device 41 so as to slide forwardly and rearwardly along the inboard side of the side-sill 40.

In the embodiment shown in FIG. 5, the guide member 42 is formed from a metallic cylindrical bar or pipe. The pipe has bent portions near its ends, and both ends are processed into flat attaching portions which are secured to the side-sill inner member 37 via the bolts 43.

The slider 44 is formed from a metallic cylindrical pipe, and slides along the peripheral surface of the straight portion of the guide member 42. The pipe has a projection bonded thereto, which is a belt attaching portion 44a.

As shown by phantom lines α in FIG. 3, when the rear door 3 is in the closed state, the belt webbing 31, the shoulder anchor 35, and the tongue 36 are so arranged as to face the flank of the seat back 23 of the front seat 21. When the front passenger pulls the belt webbing 31 to fasten the seat belt, the lower portion of the belt webbing attached to the slider 44 is caused to move towards the front seat 21 along the guide member 42 to a forward position. The engagement of the clasp at the tip of the tongue 36 with the buckle 25 results in the three-point seat belt restraint configuration for restraining the passenger in the front seat 21.

On the other hand, when the rear door 3 is opened after the front passenger unlatches the seat belt 31 and opens the front door 2, the movement of the rear door 3 pulls the belt webbing 31 rearwardly. Accordingly, the lower portion of the belt webbing attached to the slider 44 moves to a rearward position along the guide member 42, causing no interference with the legs of the rear passenger during egress from the vehicle. This is also the case with respect to passenger ingress to the vehicle.

As shown in the drawings, the vehicle further includes a scuff plate 45 made of resin, etc, a roof panel 46, a roof rail 47, a roof-rail member 48, and roof-rail inner member 49, respectively.

As described above, according to the embodiment shown in FIG. 1 to FIG. 5, there is provided the seat belt system for the vehicle 1, for restraining the passenger in the seat 21 disposed in the driver or passenger compartment of the vehicle 1, the vehicle 1 including the door opening 13 formed on at least one side of the vehicular body, and a door 3 moving between a first state where the door 3 closes at least a part of the door opening 13 and a second state where the door 3 opens the door opening 13, the seat belt system comprising, the belt webbing 31, the retractor 32 disposed in the door 3, for retracting the proximal end of the belt webbing 31, the sliding device 41 to which the distal end of the belt webbing 31 is attached so that the distal end of the belt webbing 31 is allowed to slide along the lower edge of the door opening 13 between a forward position and a rearward position. Preferably, the distal end of the belt webbing 31 may be located at the rearward position when the door 3 is in the second state, and located at the forward position when the door 3 is in the first state.

Accordingly, the distal end portion of the belt webbing 31 slides rearwardly to the rearward position along the lower edge of the door opening 13 with the opening of the door 3, which enhances the ingress and egress for the passengers while providing an improved appearance of the belt webbing 31 when the door 3 is open. Moreover, the present invention provides for the openness of the opening and improved accessibility for the legs of the passenger to the seat.

Additionally, the sliding device 41 comprises a guide member 42 disposed on the lower edge of the door opening 13 so as to extend along the lower edge, and the slider 44 to which the distal end of the belt webbing 31 is attached is fitted onto the guide member 42 so as to be slidable between the forward portion and the rearward portion of the guide member 42.

Accordingly, the distal end of the belt webbing 31 slides along the lower edge of the door opening 13 according to the movement of the door 3 with the aid of the guide member 42 and the slider 44, which ensures the sliding of the distal end of the belt webbing 31.

Further, the shoulder anchor 35 is disposed on the upper portion of the inboard surface of the door 3 and supports the middle portion of the belt webbing 31 between the distal end and the proximal end. Accordingly, the shoulder anchor 35 provides stable support for the belt webbing 31 and the three-point seat belt restraint configuration for restraining the passenger.

Moreover, the door 3 is swingably supported on the vehicle body at its trailing edge via the hinge 5. Accordingly, the end portion of the belt webbing 31 slides rearwardly to the rearward position for the vehicle 1 by the swing movement of the door 3 about the hinge 5 on its rear portion. Thus, the belt webbing 31 provides no interference with the legs of a rear passenger in egress or in ingress to enhance the convenience of the ingress and egress for the passengers.

Additionally, the vehicle comprises the front door 2 disposed ahead of the rear door 3 and being swingably supported on the vehicle body at its leading edge via the hinge 4, and the front door 2 and the rear door 3 cooperatively close the door opening 13. Accordingly, the rear door 3 and the front door 2 constitute a double door configuration, which attains the larger door opening 13 for efficient use.

Further, the door opening 13 is a continuously formed single opening. Accordingly, a center-pillar-less structure, that is a structure without a center-pillar, is attained in combination with the double door configuration, so that of the door opening is large and the efficient use of the continuous opening (the door opening 13) are available.

Moreover, the vehicle comprises the front seat 21 and the rear seat 28, and the seat belt system is permitted to restrain an occupant, or a passenger in the front seat 21 when the rear door 3 is in the first state, or closed. Accordingly, the driver or passenger on the front seat 21 is reliably restrained by the belt webbing 31 to improve safety.

Figure 6:
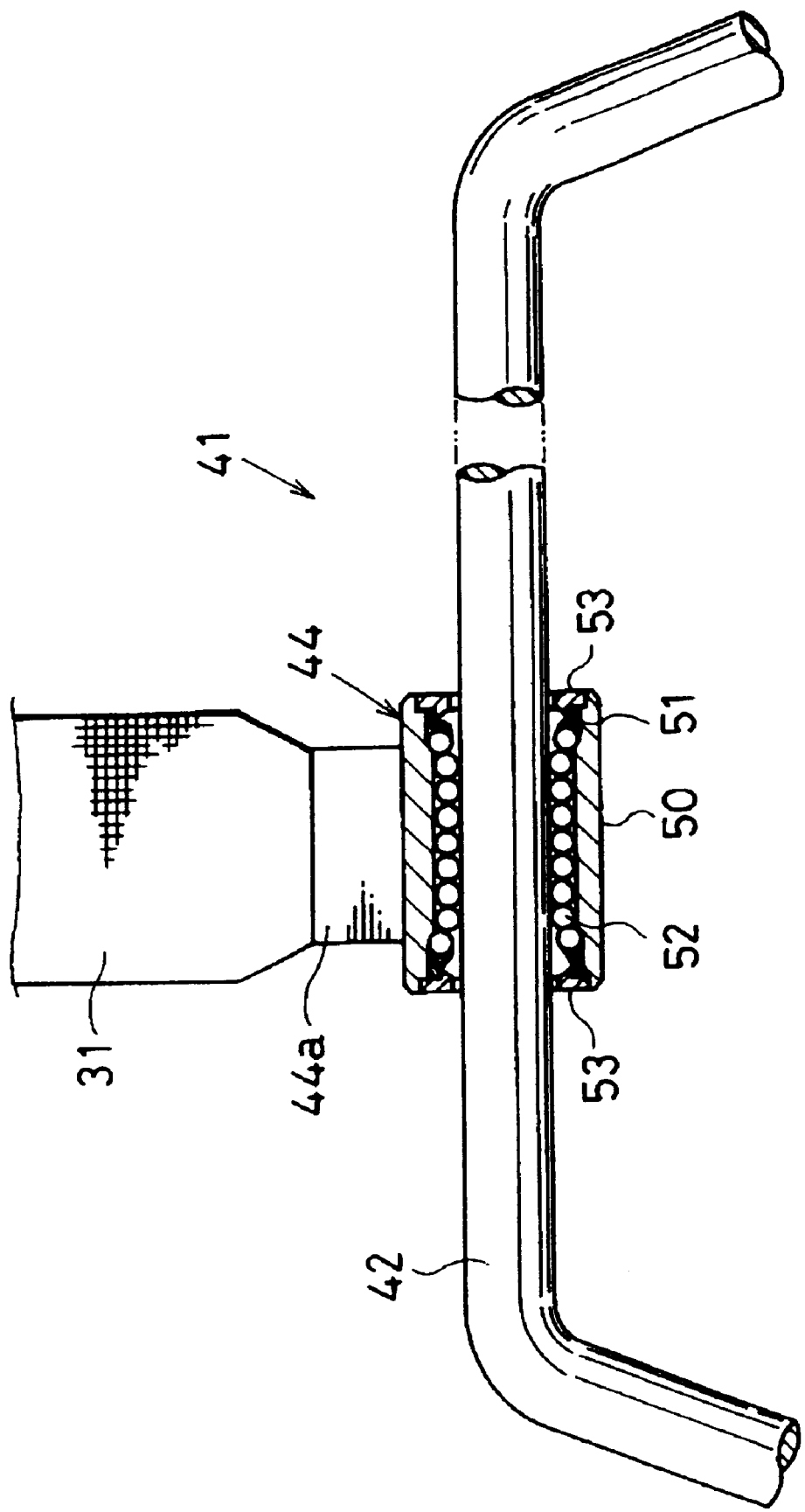
FIG. 6 is a cross-sectional view of a preferred embodiment of the sliding device.

The sliding device 41 may be constructed as shown in FIG. 6. As shown in FIG. 6, the sliding device 41 comprises a guide member 42 formed from a cylindrical bar or pipe with a prescribed straight length, a ball bearing type slider 44 with an outer tube 50, a holder 51, a number of steel balls 52, and stopper rings 53. On the outer tube 50, a belt attaching portion 44a is fixed or integrally formed therewith, to which the lower end of the belt webbing 31 is attached.

According to the above construction, friction of the slider 44 in sliding motion during the movement of the rear door 3 is reduced, so that the lower end of the belt webbing 31 slides more reliably and smoothly. Where necessary, stoppers such as E-rings, stopper rings, and stopper pins may be attached on the forward end and rearward end of the guide member 42.

An alternative embodiment of the present invention will now be described with reference to FIG. 7 to FIG. 9. The description on the common construction, operation and advantages as those of the preceding embodiment is omitted, and the elements identical to the ones in the preceding drawings are given identical reference numerals.

Figure 7:
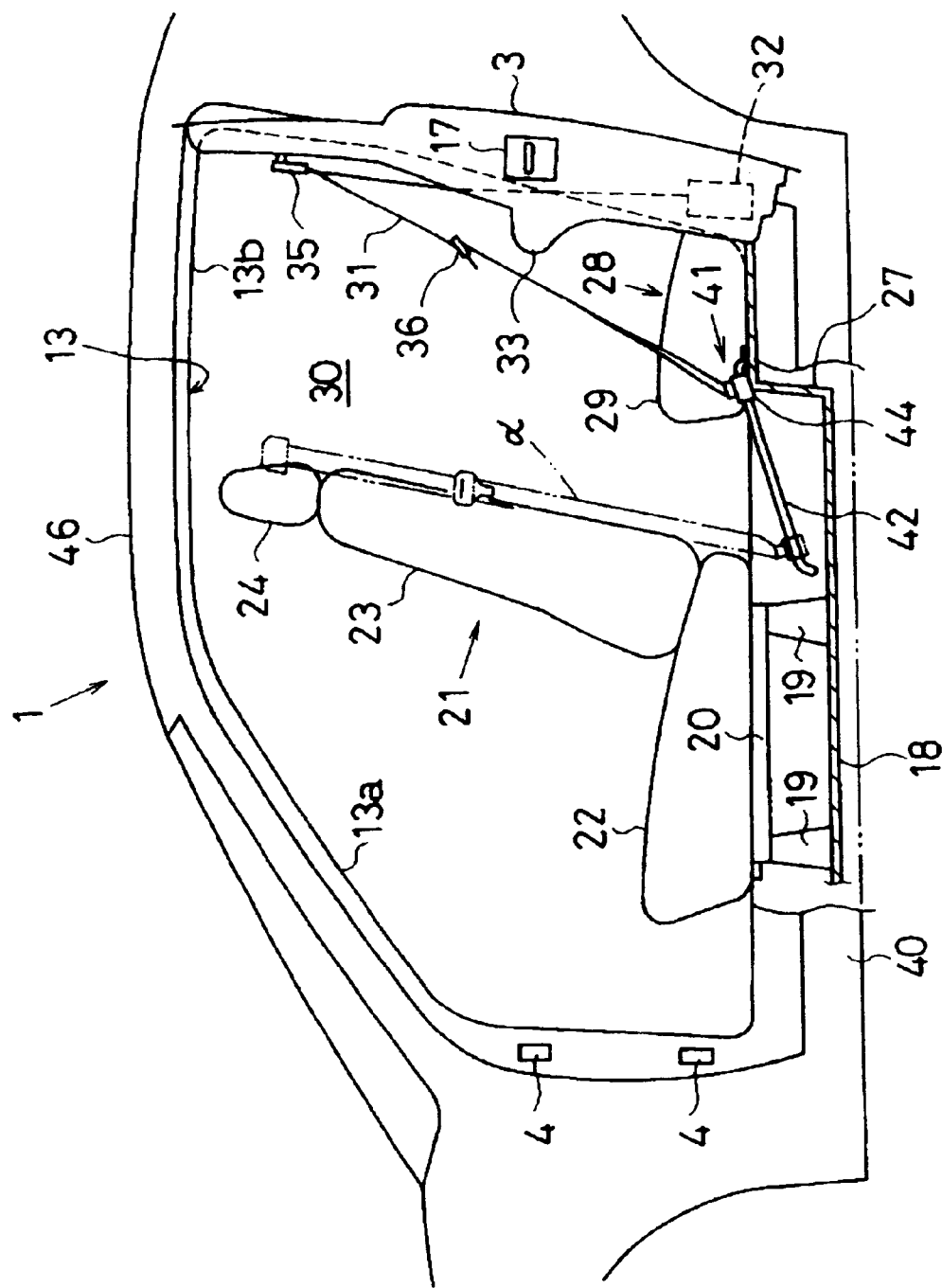
FIG. 7 is an elevational view illustrating the movement of the belt webbing by the opening of the rear door in a second embodiment of the present invention.
Figure 8:
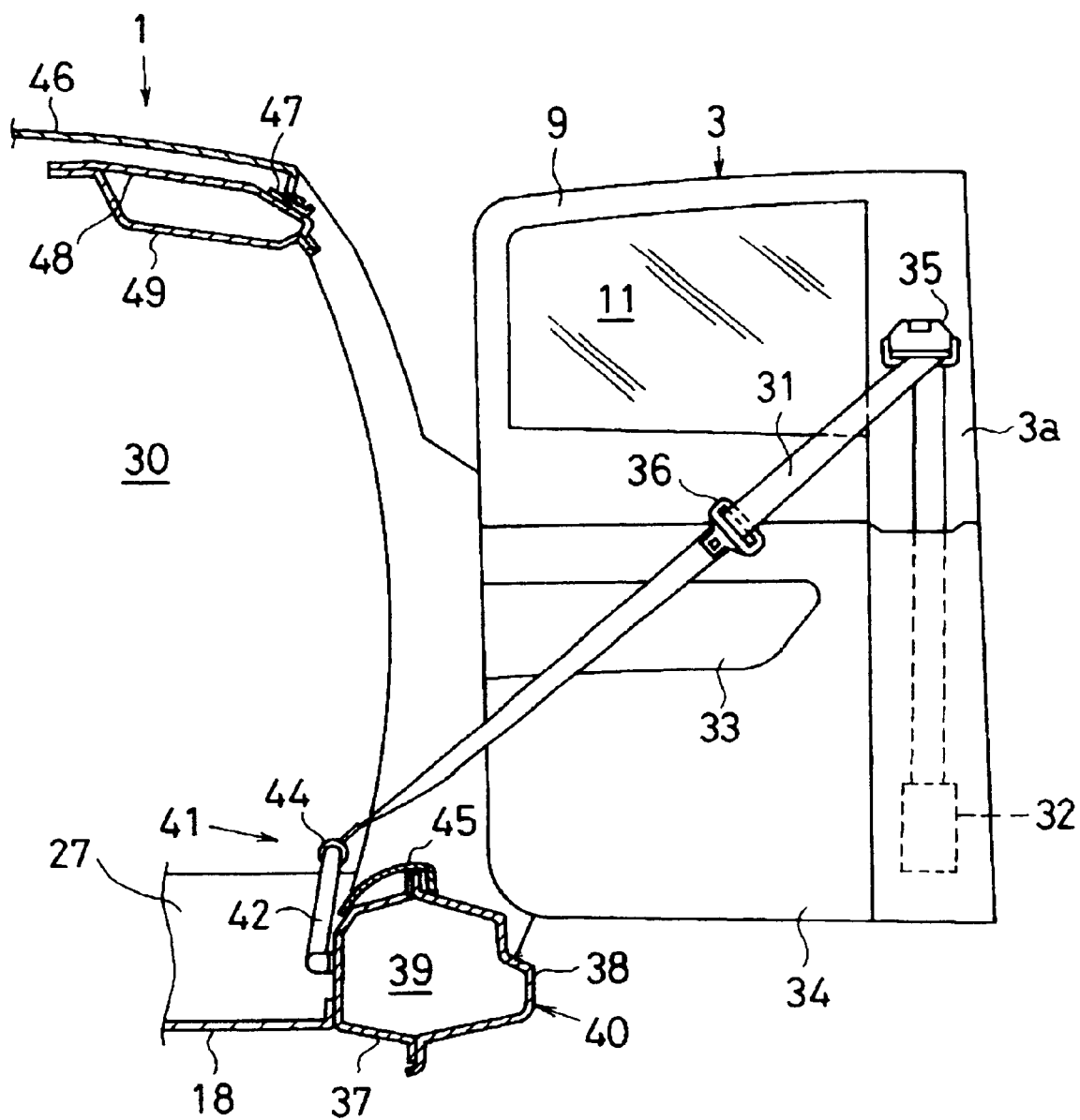
FIG. 8 is an elevational view of a portion of the vehicle illustrated in FIG. 7, when the rear door is open.
Figure 9:
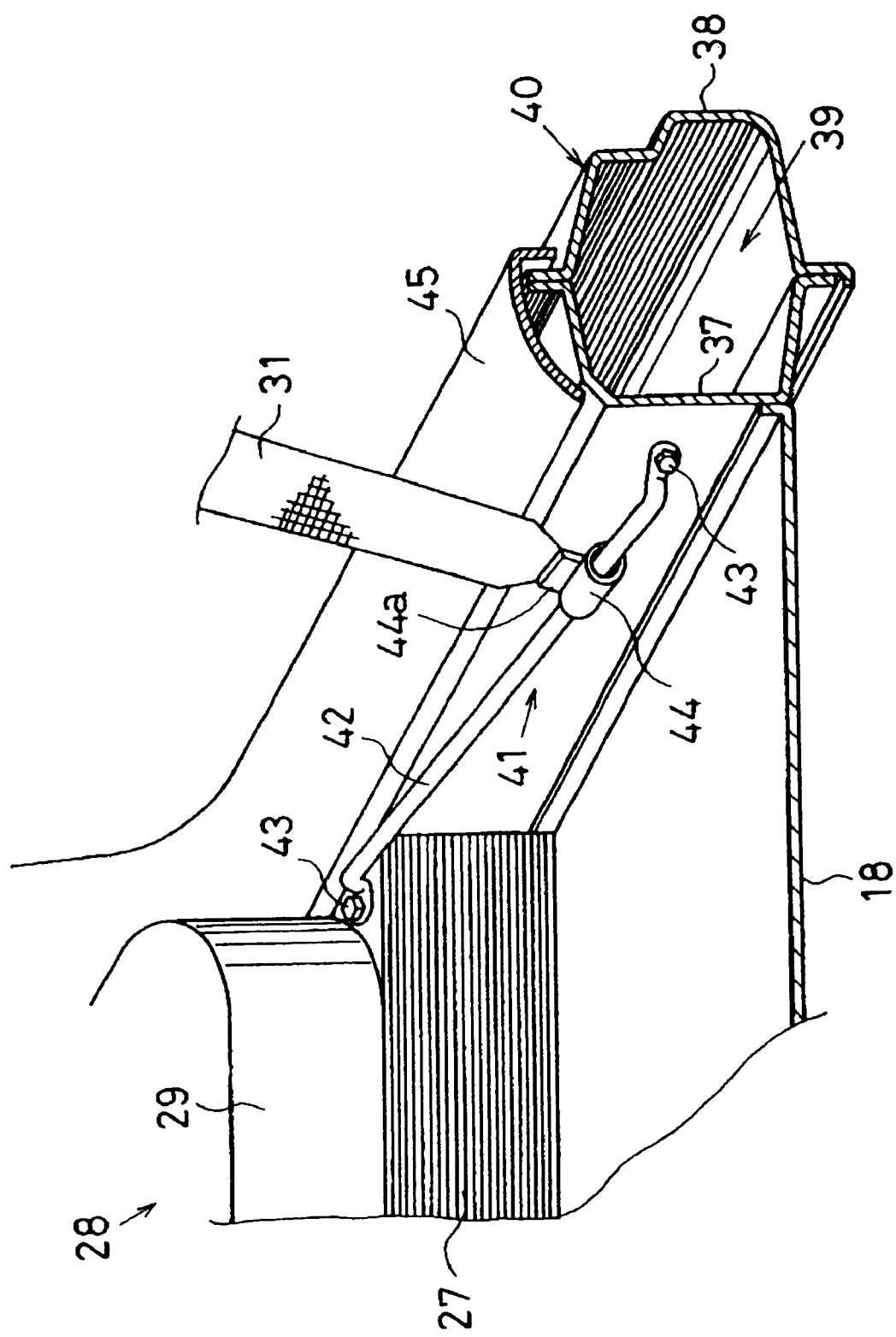
FIG. 9 is a perspective view showing the sliding device in a slanting position.

In the embodiment shown in FIG. 7 to FIG. 9, the guide member 42 slopes downwardly in a forward direction, or is slantingly disposed with an end located at the side-sill inner member 37 and the other end located at a top deck surface of the kick-up 27. The slider 44 slidably fits onto the straight portion of the guide member 42.

According to this construction, when the rear door 3 is in the closed state, the belt webbing 31 is shown as indicated by phantom lines a in FIG. 7. On the other hand, when the rear door 3 is opened after the front door 2 is opened, the slider 44 and the lower end of the belt webbing 31 are pulled rearwardly along the slantingly-disposed guide member 42 until the slider 44 reaches the top surface of the kick-up 27 laterally adjacent to the flank of the seat cushion 29 of the rear seat 28 as indicated by solid lines in FIG. 7. The rearward movement of the slider 44 is longer than that of the embodiment shown in FIG. 1 to FIG. 5, and causes no interference with the legs of the rear passenger during ingress to and egress from the vehicle.

As described above, in the seat belt system for the vehicle shown in FIG. 7 to FIG. 9, the sliding device 41 comprises the guide member 42 fixed to the body and the slider 44 which slides on the guide member 42, the vehicular body includes the kick-up 27 stepped upwardly on which the rear seat 28 is disposed, and the rearward portion of the guide member 42 is disposed laterally adjacent to the rear seat 28 on the kick-up 27. Particularly, the guide member 42 is slantingly disposed with an end located at the side-sill inner member 37 and the other end located at the top surface of the kick-up 27. Accordingly, the lower end of the belt webbing 31 is guided by the slantingly-disposed guide member 42 and slider 44 to slide up to the vicinity of the rear seat 28, or slide to a further rearward position, so that greatly-improved access for the rear passenger during ingress to and egress from the vehicle is attained.

It should be appreciated at the constitution shown in FIG. 6 may be adapted to the sliding device 41 shown in FIG. 7 to FIG. 9.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of the present invention.

We claim:

1. A seat belt system for a vehicle, for restraining an occupant in a seat disposed in a passenger compartment of the vehicle, the vehicle including an opening formed on at least one side of a vehicular body, and a first door moving between a first state where the first door closes at least a part of the opening and a second state where the first door opens the opening, said seat belt system comprising,
   a belt webbing,
   a retractor disposed in the first door, for retracting a proximal end of said belt webbing, and
   a sliding means fixed on a lower edge of the opening;
   wherein a distal end of said belt webbing is attached to said sliding means so that the distal end of said belt webbing is allowed to slide along the lower edge of the opening between a forward position and a rearward position in response to movement of the first door.

2. A seat belt system for a vehicle as defined in claim 1, said sliding means comprising,
   a guide member disposed on the lower edge of the opening so as to extend along the lower edge,
   and a slider fitted onto said guide member and slidable between a forward portion and a rearward portion of the guide member with the distal end of said belt webbing being attached to said slider.

3. A seat belt system for a vehicle as defined in claim 2, wherein,
   said slider is located at the rearward portion of said guide member when the first door is in the second state, and located at the forward portion of said guide member when the first door is in the first state.

4. A seat belt system for a vehicle as defined in claim 3, the vehicle further comprising a front seat and a rear seat, wherein,
   said seat belt system restrains an occupant in the front seat when the first door is in the first state.

5. A seat belt system for a vehicle as defined in claim 4, the vehicular body including a kick-up portion stepped upwardly on which the rear seat is disposed, wherein,
   the rearward portion of the guide member is located laterally adjacent to the rear seat on the kick-up portion.

6. A seat belt system for a vehicle as defined in claim 1, further comprising,
   a shoulder anchor, disposed on an upper portion of an inboard surface of the first door, and supporting a middle portion of said belt webbing between the distal end and the proximal end.

7. A seat belt system for a vehicle as defined in claim 1, wherein,
   the first door is swingably supported on the vehicular body at a trailing edge by way of a first hinge.

8. A seat belt system for a vehicle as defined in claim 7, the vehicle further comprising a second door disposed ahead of the first door and swingably supported on the vehicular body at a leading edge by way of a second hinge, wherein,
   the first door and the second door cooperatively close the opening.

9. A seat belt system for a vehicle as defined in claim 8, wherein,
   the opening is a single continuously formed opening.

10. A seat belt system for a vehicle for restraining an occupant, the vehicle including a seat mounted in a vehicle compartment, an opening formed on at least one side of a vehicular body, a door swingably supported on the vehicular body at a trailing edge by way of a hinge so as to move between a first state where the door closes at least a part of the opening and a second state where the door opens the opening, said seat belt system comprising,
    a belt webbing,
    a retractor disposed in the door, for retracting a proximal end of said belt webbing, and
    a sliding means fixed on a lower edge of the opening, to which a distal end of said belt webbing is attached so that the distal end of said belt webbing is permitted to slide along the lower edge of the opening between a forward position and a rearward position,
    wherein,
    the distal end of said belt webbing is located at the rearward position when the door is in the second state, and located at the forward position when the door is in the first state.

11. A seat belt system for a vehicle for restraining an occupant, the vehicle including a front seat and a rear seat arranged in a vehicular longitudinal direction in a vehicle compartment, an opening continuously formed on at least one side of a vehicular body, a front door swingably supported on the vehicular body at a leading edge by way of a first hinge, and a rear door swingably supported on the vehicular body at a trailing edge by way of a second hinge, wherein the front door and the rear door cooperatively constitute a double door configuration for the opening, said seat belt system comprising,
    a belt webbing,
    a retractor disposed in the rear door, for retracting a proximal end of said belt webbing,
    a guide member disposed on a lower edge of the opening so as to extend along the lower edge with a rear end portion positioned laterally adjacent to the rear seat,
    a slider fitted onto said guide member and slidable between a forward portion and a rearward portion of the guide member with a distal end of said belt webbing being attached to the slider, and
    a shoulder anchor, disposed on an upper portion of an inboard surface of the rear door, and supporting a middle portion of said belt webbing between the distal end and the proximal end,
    wherein,
    said slider is located at the rearward portion of said guide member when the rear door is open, and located at the forward portion of the guide member when the rear door is closed so that said seat belt system restrains an occupant in the front seat when the rear door is closed.

* * * * *